United States Patent [19]

Cardell, Jr. et al.

[11] 3,753,233

[45] Aug. 14, 1973

[54] METHOD AND APPARATUS FOR DATA ENTRY

[75] Inventors: Nicholas W. Cardell, Jr., Westport, Conn.; Richard James Manzo, Somerset County, N.J.

[73] Assignee: The Bunker-Ramo Corporation, Oak Brook, Ill.

[22] Filed: Feb. 4, 1971

[21] Appl. No.: 112,637

[52] U.S. Cl. ..................... 340/172.5

[51] Int. Cl. ..................... G06f 3/14

[58] Field of Search ..................... 340/172.5; 235/157

[56] References Cited

UNITED STATES PATENTS

| | | | |
|---|---|---|---|
| 3,618,032 | 11/1971 | Goldsberry et al. | 340/172.5 |
| 3,596,254 | 7/1971 | Highleyman et al. | 340/172.5 |
| 3,501,746 | 3/1970 | Vosbury | 340/172.5 |
| 3,500,335 | 3/1970 | Cuccio | 340/172.5 |
| 3,389,404 | 6/1968 | Koster | 340/172.5 |
| 3,364,473 | 1/1968 | Reitz | 340/172.5 |
| 3,248,705 | 4/1966 | Dammann et al. | 340/172.5 |

*Primary Examiner*—Paul J. Henon
*Assistant Examiner*—Mark Edward Nusbaum
*Attorney*—Frederick M. Arbuckle

[57] ABSTRACT

A data entry system employing input stations, each comprising a keyboard and a real time information display. An individual format guidance mask may be requested for display to facilitate a particular data entry. In the system disclosed, the display is a cathode ray tube. Each format guidance mask incorporates alternative fields or words for the most often required information in the data entry requested. Alternative words are displayed in groups on the same line and are normally arranged from left to right according to their descending frequency of use. A data entry is composed by erasing the words in each line that do not apply and tabbing over the word or words that do apply. To this end the display is provided with a cursor or place marker and the keyboard of the invention comprises a word erase key for erasing words one at a time, a tab key for tabbing over words one at a time, and a line erase key for erasing the remaining portion of a line. Thus, the most frequent keyed sequence is tabbing over the first and most frequently desired alternative word and line erasing the remainder of the line. The word erase key is only used if a less frequently chosen alternative is desired. A stock securities order data entry system is disclosed in detail.

36 Claims, 13 Drawing Figures

METHOD AND APPARATUS FOR DATA ENTRY

SUMMARY OF THE INVENTION

This invention relates to a method and apparatus for data entry. More particularly it relates to data entry stations comprising a keyboard and a display. Such stations may be connected through appropriate lines and control units to a central data processor or to a data recorder. The invention provides data entry stations wherein a selected data entry mask or format may be displayed upon demand. This mask comprises the most frequently utilized words relating to the desired data entry and is derived from the central data processor, the data recorder, or the terminal control unit. Each group of alternative words is normally arranged from left to right on a single line according to descending frequency of use. The mask is edited at the input station to compose the desired data entry by erasing the non-applicable words in the format and retaining the applicable words. If necessary, variable information may be inserted. The completed data entry then is transmitted to a central data processor or recorder as the case may be. The editing is accomplished through the use of a grouped minimum number of editing keys facilitating rapid and accurate one hand data entry by unskilled input operators who may have no typing skill. Furthermore, the same data station may be used without alteration in a wide variety of systems to enter a wide variety of data messages.

Fast, accurate and convenient entry of data is the key to efficient data processing. Many data entry stations presently in use and contemplated for future applications comprise a keyboard and a cathode ray tube display. Unfortunately, such data entry stations in most presently contemplated data processing systems require special purpose keyboards for each system in order to fulfill the desired objects of fast, accurate, and convenient entry of data. In addition to the usual alphanumeric typewriter keyboard such special purpose keyboards usually are provided with a large number of special purpose keys, each used to enter an often used word or code, thus reducing the number of key strokes required. Unfortunately as the number of alternative special purpose codes and thus keys becomes large, the sheer number of keys and the complexity of using the additional keyboard defeats the purpose of ease of data entry. Furthermore the design of a wide variety of special purpose keyboards for different applications increases the unit cost of such data entry stations. If such special keyboards are not provided the operator must type each entire message individually. This not only requires a skilled typist but is time consuming and error prone. Furthermore, the operator must be familiar with format in which data is being entered, or must frequently refer to a format sheet, a time consuming and error prone operation. If the operator is an executive, businessman, stockbroker, etc., for whom data entry is only an incidental part of his job, remembering entry formats, particularly long ones, can be particularly troublesome, and a data entry system with self-teaching capability would be preferable. Another problem with existing special purpose keyboards is that they lack flexibility. Any change in the user requirements necessitates a complicated and expensive recoding of the keyboard.

Accordingly, it is an object of the present invention to provide a data entry station facilitating the fast, accurate and convenient entry of data.

Another object of the invention is to provide a data entry station of the above character easily operated by untrained personnel.

A further object of the invention is to provide a data entry station of the above character that requires no typing skill and provides a minimum number of keys.

A still further object of the invention is to provide a data entry station of the above character than can be used to compose a data entry by the repetitive use of a small number of keys.

Another object of the invention is to provide a data entry station of the above character providing for the entry of data by means of operator YES, NO decisions.

Still anothr object of the invention is to provide data entry apparatus of the above character that guides the operator while composing the data entry as if the operator were checking boxes on a standard form.

Yet another object of the invention is to provide data entry apparatus of the above character which minimizes operator hand movement across the keyboard while increasing operator accuracy.

A further object of the invention is to provide a flexible data entry system which may be easily modified to accommodate changing user requirements.

Other objects of the invention will in part be obvious and will in part appear hereinafter.

The foregoing and other objects, features and advantages of the invention will be apparent from the following more particular description of a preferred embodiment of the invention as illustrated in the accompanying drawings.

In the drwings:

The same reference numbers refer to the same elements throughout the several views of the drawings.

DETAILED DESCRIPTION

Figure 1:
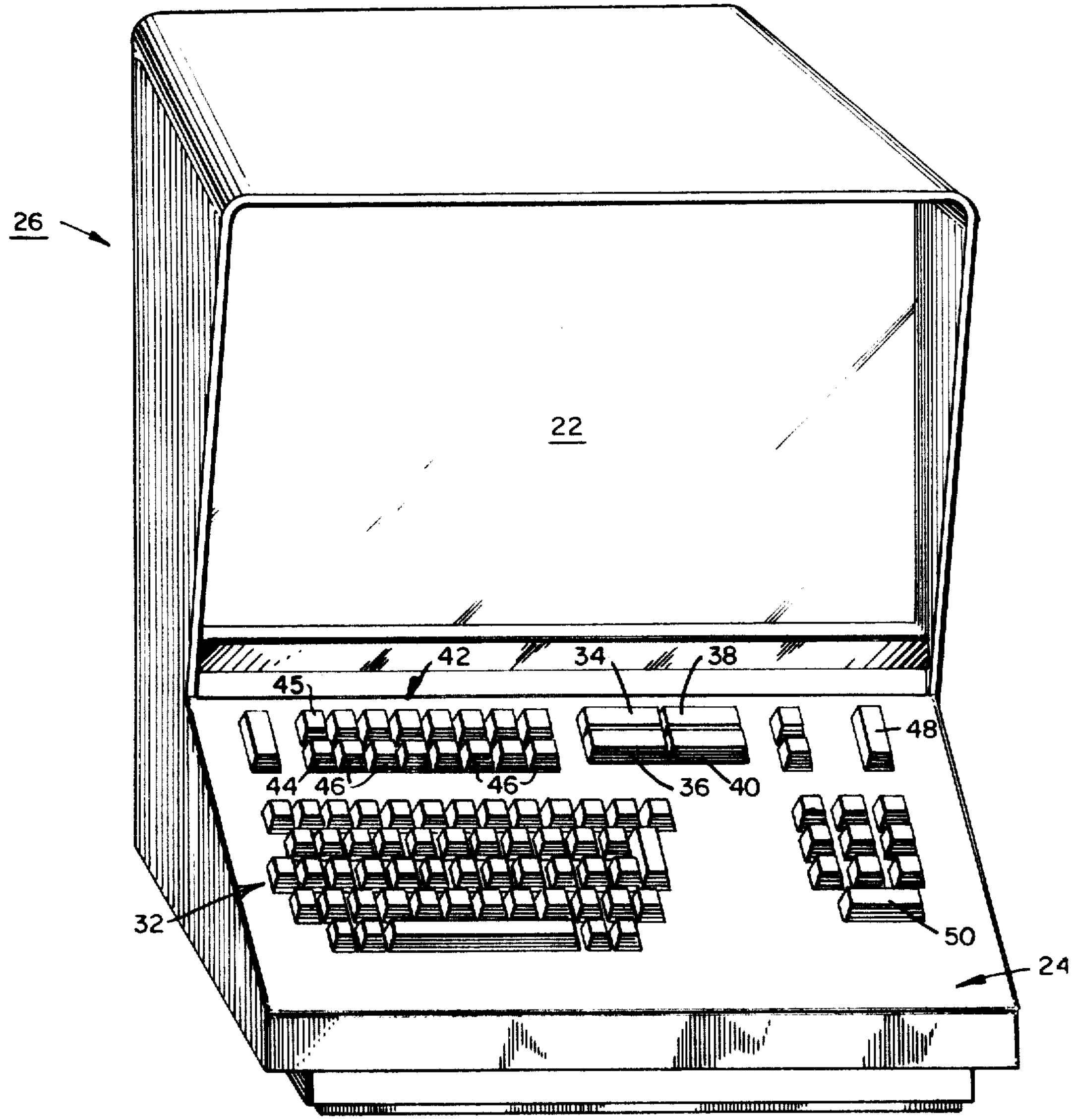
FIG. 1 is a perspective view of an input station, incorporating a cathode ray tube display for the composition of data entry messages according to the invention.

Referring to FIG. 1, an input station 26 according to the invention comprises a cathode ray tube 22 and a keyboard 24. As described below, this unit is used by its operator to request a format guidance mask for the desired data entry, to compose the data entry message using the format mask displayed on cathode ray tube 22, to visually verify the message, to make corrections if necessary, and in the embodiment disclosed, to transmit the message to a central data processing station. For illustrative purposes, the data entry system of this invention will be described in connection with the composition of the stock or security order data entry.

Figure 2:
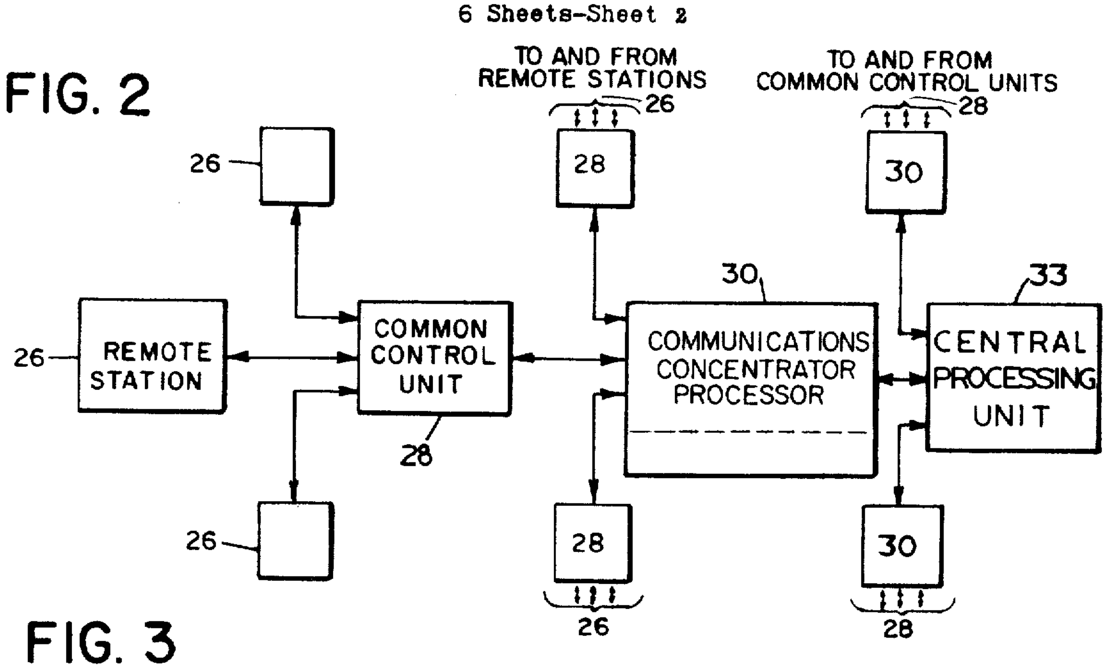
FIG. 2 is a schematic diagram of a system according to the invention.

A data entry system according to the invention is shown in FIG. 2. Various elements of the system are disclosed in detail in U.S. Pat. No. 3,368,028, issued Feb. 6, 1968, on an application of R.Windels, et al, entitled "Data Entry Apparatus"; in U.S. Pat. No. 3,500,327 issued Mar. 10, 1970; on an application of R.D. Belcher, et al, entitled "Data Handling Apparatus", where a stock quotation system is disclosed in detail; and in United States patent application of Dixson Teh-Chao Jen entitled "A Circuit for Controlling the Loading and Editing of Information in a Recirculating Memory", filed on Oct. 31, 1969 under Ser. No. 872,925, where a cathode ray tube control unit is disclosed. These patents and applications are assigned to the assignee of the present application. The tab control feature and cursor, which are explained below, are disclosed in detail in the United States patent application of Dixson Teh-Chao Jen, Stephen A. Grosky, and Robert J. Duggan, entitled "Character Storage and Display System", filed on Sept. 16, 1968, under Ser. No. 767,559. Except where otherwise indicated in the discussion to follow, the structure of this system is basically the same as that known and in use in commercially available products of applicants' assignee. One product of this type is designated the Bunker-Ramo Series 2200 System. These above identified patents, applications, and products are incorporated herein by reference.

In the system shown in FIG. 2, common control unit 28 incorporates a recirculating storage medium such as a delay line, magnetic drum, magnetic disc, or appropriately addressed core memory to control the display on cathode ray tubes 22 at remote stations 26. As will be described in more detail later, common control unit 28 also incorporates a series of shift registers and associated circuitry to control the various editing features discussed below. These systems may, for example, use a delay line as disclosed in the above-identified R. Windels, et al patent, and the above-identified United States patent application of D. Jen, et al (Ser. No. 767,559). The stored information recirculates bit by bit through the delay line and the registers and back through to the delay line. As each character to be displayed passes a selected point in the delay loop, the character is applied to control the display on cathode ray tube 22 of an associated remote station 26. The information recirculates at a rate which causes it to be displayed on cathode ray tube 22 often enough to provide a continuous display. Information to be displayed at two or more remote stations may be stored in the delay line of a unit 28 with the routing and editing to a proper station being clock controlled.

Common control unit 28 also comprises means for providing a cursor or position marker which is displayed on cathode ray tube 22 to aid the operator in editing the display. As the operator uses the various keys on keyboard 24, the cursor or marker moves from character to character to continually inform the operator of the character in the display at which a new editing operation would begin. The normal movement of the cursor is basically the same as is described in the above mentioned patent applications. The manner in which the cursor is moved for certain special editing functions will be described later. Preferably the cursor takes the form of a white display cell marker which covers or surrounds the character at which the next entry or editing operation will commence. However, in order to permit viewing of this character, the character and cursor marker may be alternately flashed on the screen.

Common control unit 28 is connected through a standard communications concentrator processor 30 to a central processing unit (CPU) 33. Communications concentrators such as processor 30 are small special or general purpose processing units which may be programmed to perform polling, message routing, and other communications housekeeping functions. An example of a small general purpose processor suitable for use as the processor 30 is the Honeywell Model 516. For this invention, processor 30 may also be provided with an additional portion 31 which includes a memory and circuitry which, under program control, permits the processor to respond directly to selected types of queries from a remote station such as a query for a data entry mask. The portion 31 of processor 30 functions to perform data retrieval in much the same way as the satellite processors function to perform this function in the before mentioned Belcher, et al patent. CPU 33 may be any of a variety of well-known general purpose computers. The use of such computers for performing the query and response function is likewise well-known, with the before mentioned Bunker-Ramo Series 2200 System being an example of an application in which a CPU is so utilized. As may be seen from FIG. 2, a single CPU 33 may be utilized to service a plurality of concentrators 30.

Figure 3:
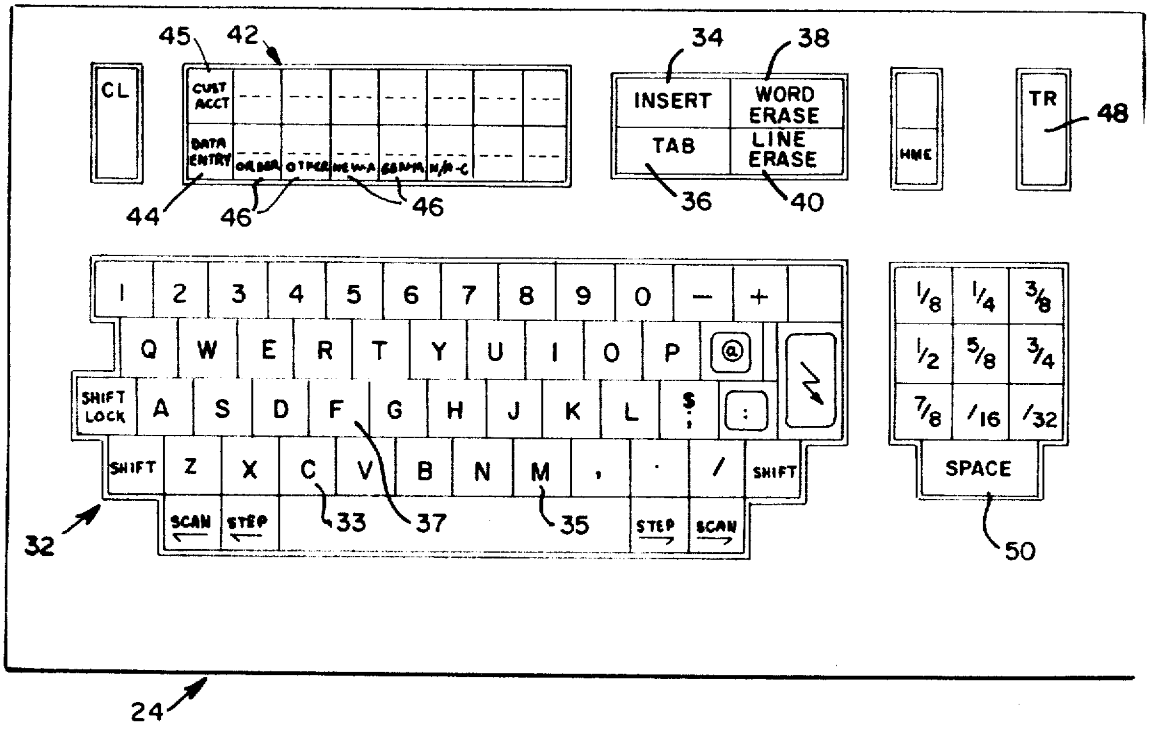
FIG. 3 is a diagram of the keyboard of the input station of FIG. 1.

Now referring to FIG. 3, in addition to the conventional alpha-numeric data input keyboard 32, the keyboard 24 is provided with an INSERT key 34, a TAB key 36, a WORD ERASE key 38, and a LINE ERASE key 40. These four keys are conveniently grouped together for easy one hand operation.

When it is desired to insert information not specified in the displayed format mask, the INSERT key 34 is depressed and one or more of the alpha-numeric keys 32 are utilized to compose the insert. When the mask contains reminder words which require the operator to key-in variable information, the insert key is not used. Only the alpha-numeric keys that represent the information need be pressed, since, as will be seen shortly, the first key pressed will clear the reminder words from the display, leaving sufficient room for the additional information.

Depression of the TAB key 36 causes the cursor to move one field (generally one word in the discussion to follow) to the right, as explained in detail in the above identified Jen, Grosky and Duggan application.

Depression of the WORD ERASE be 38 causes the word displayed in the marked field to be erased and the cursor to move to the next field. Depression of the LINE ERASE key 40 causes the field marked by the cursor and the remainder of the line to be erased. The manner in which both these erase operations are performed is discussed in connection with the description of FIG. 4.

The keyboard 24 is also provided with a group of function keys generally indicated at 42, comprising a DATA ENTRY key 44, CUSTOMER ACCOUNT ENTRY key 45, and DATA TYPE SELECTOR keys 46.

Figure 4:
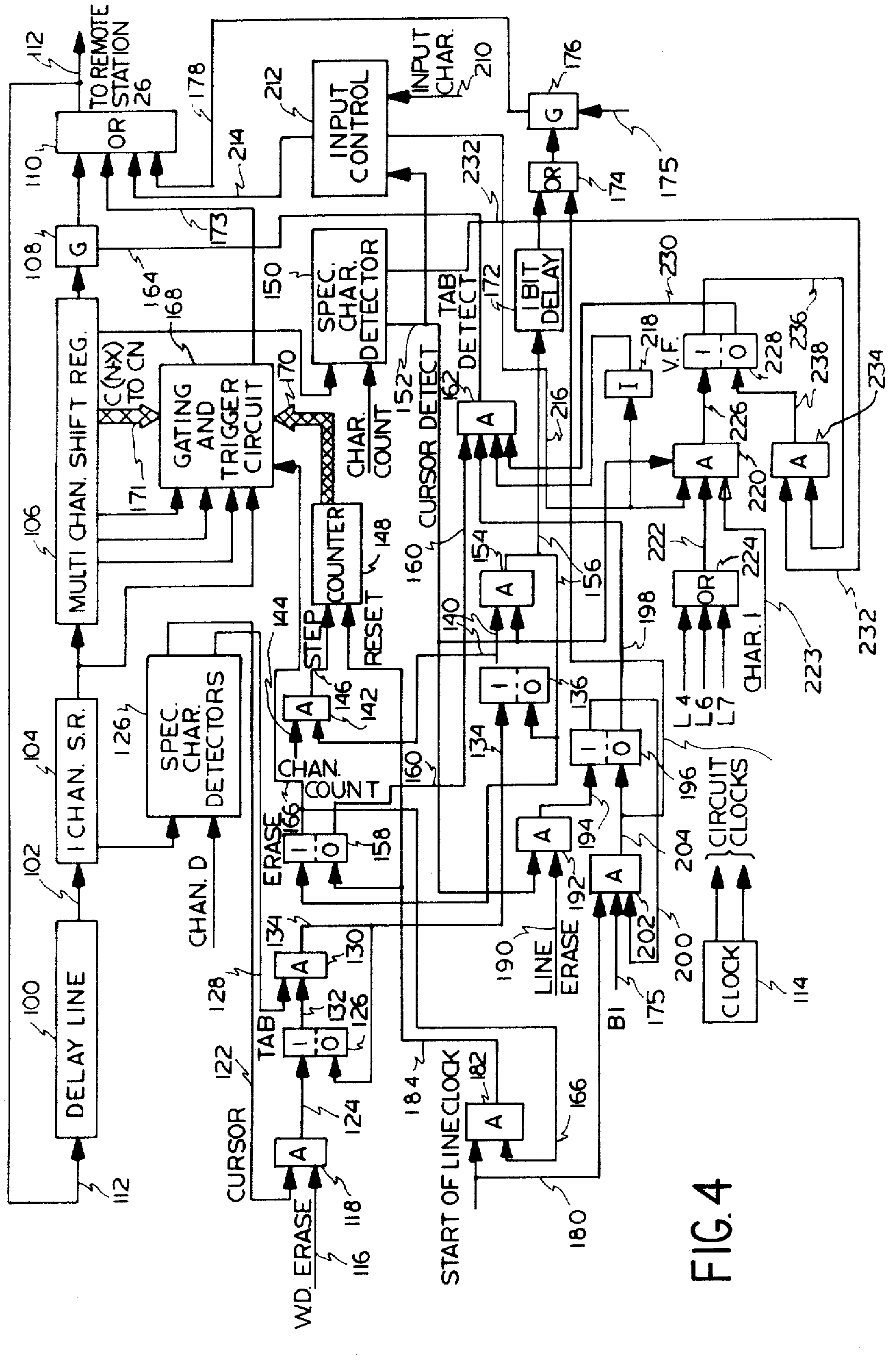
FIG. 4 is a schematic diagram of a portion of a common control unit of FIG. 2.

Referring now to FIG. 4, a portion of the circuitry in a common control unit 28 is shown. From this figure it is seen that information stored in delay line 100 is applied through line 102, one character shift register 104, multi-character shift register 106, normally-open gate 108, OR gate 110, and line 112 to the input of the delay line. Line 112 is also connected to control the display at a remote station 26. A clock 114 is provided which operates in synchronism with the delay line and generates outputs indicating the line, character, and bit of the display which are, at each instant of time, appearing on line 112, and thus at the output from shift register 106. Clock 114 also generates a number of special signals such as a signal at the first bit time of each line (start of line) and a character clock signal when a full character is in shift register 104 and in each character position of shift register 106. In order to simplify the drawing, no attempt has been made to connect the output from clock 114 to the various points in the circuit at which it is utilized. Instead, a line appears at each of these points with the proper clock designation. In the discussion to follow, it is assumed that all flip-flops in the circuit are initially in their ZERO state.

When the WORD ERASE key 38 on keyboard 24 is depressed, the word on the display having an entry marker in its first character position is to be erased and the remaining words on the line are to be shifted to the left to fill the space left by the erased word. To perform this function, the depression of the WORD ERASE key causes a signal to appear on word erase line 116 in FIG. 4. This signal is applied as one input to AND gate 118. When the cursor bit is detected in the character stored in one character shift register 104, special character detector 120 generates an output on cursor line 122 to fully condition AND gate 118. The resulting output signal on line 124 is applied to transfer flip-flop 126 to its ONE state.

As was indicated in the before mentioned Jen, et al patent application (Ser. No. 767,559), each character has an extra bit position with the first character not having a bit in this position after a character having a bit in this position being recognized as a tab point. After flip-flop 126 is set to its ONE state, the character having the cursor bit is shifted into multi-character shift register 106, as are the following characters of the word. Shift register 106 is selected to be longer than any word which is to appear in the display and a tab point is provided at the beginning of each word. Thus, when a tab point is detected by detector 120 in one-character shift register 104, the entire word which it is desired to erase has been shifted into register 106, and the first character of the next word on the display, the word which is to be shifted into the position vacated by the erased word, is in register 104. The detection of the tab point in register 104 by detector 120 causes a tab signal on line 128 which is applied to fully condition AND gate 130, the other input to this AND gate being ONE side output line 132 from flip-flop 126. Output line 134 from AND gate 130 is connected to reset flip-flop 126 to its ZERO state and to set COUNT flip-flop 136 to its ONE state.

ONE side output line 140 from COUNT flip-flop 136 is connected as one input to AND gate 142 the other output to this AND gate being character clock line 144 from clock 114. Output line 146 from AND gate 142 is connected as the step input to counter 148. Thus, the count in counter 148 is incremented for each character loaded into multiple character shift register 106 after the tab point is detected at the input to this register. This counter thus records the progress of the tab character in register 106.

When the cursor contained in the first character position of the word to be erased reaches the last character position in register 106, special character detector 150 generates an output on its cursor-detect line 152. The signal on cursor-detect line 152 is applied as one input to AND gate 154, the other input to this AND gate being the line 140 which has a signal on it at this time. AND gate 154 is thus fully conditioned to generate an output on line 156 which is applied to reset COUNT flip-flop 136 to its ZERO state, thus preventing futher incrementing of counter 148, and to set ERASE flip-flop 158 to its ONE state.

ZERO side output line 160 from ERASE flip-flop 158 is connected as one of the conditioning inputs to AND gate 162, the output line 164 from which is the conditioning input to gate 108. Thus, when flip-flop 158 is set to its ONE state, gate 108 is deconditioned blocking the word then emerging from register 106, the cursor-containing word which is to be erased, from being circulated back into the delay line. The erasure of this word is thus effected.

ONE-side output line 166 from ERASE flip-flop 158 is connected as an enabling input to gating-and-trigger circuit 168, the other inputs to which are the output lines 170 from counter 148, the outputs from character position taps on shift register 106, and the character ($N-X$) through character $N$ clock lines 171 (where $X$ is the number of character positions in register 106 and $N$ is the number of characters on a display line). The signal on line 168 sets a trigger indicated by the count on lines 170. This conditions a gate to pass signals on the shift register output line containing the tab character, through line 173 to OR gate 110. Since the character on line 170 is applied to OR gate 110 in place of the cursor-containing character which would normally have been outputted from register 106, the desire shift operation is performed. The signal on line 156 is delayed by one-bit time in delay 172 and applied through OR gate 174 to condition gate 176 to, at the next bit one (cursor) time, pass a clock signal through line 178 to OR gate 110. A cursor bit is thus written into the first character position of the word following the erased word.

As the first character of the next line reaches each tap on register 106 an appropriate character clock on a line 171 resets the trigger corresponding to the tap. Thus, bits continue to be read from the selected tap on the shift register through circuit 168 until the end of the line containing the erased word reaches the tap. At the first bit time of the following line, when the first character for this line reaches the end of register 106, a start-of-line clock signal appearing on line 180 is applied to one input of AND gate 182, the other input to this AND gate being output line 166 from ERASE flip-flop 158. AND gate 182 is thus fully conditioned to generate an output signal on line 184 which is applied to reset ERASE flip-flop 158 to its ZERO state, permitting the normal recirculation of information in the delay line loop to be resumed, and to reset counter 148 to a count of zero. The circuit is thus restored to its initial condition in preparation for the next editing input.

When line erase key 40 on keyboard 24 is depressed, a signal is applied through line 190 to one input of AND gate 192. When the first character of the word containing the cursor reaches the last position in shift register 106, detector 150 generates a cursor-detect output on line 152 which is applied to fully condition AND gate 192 to generate an output on line 194. The signal on line 194 is applied to switch LINE ERASE flip-flop 196 to ONE state. ZERO side output line 198 from flip-flop 196 is one of the conditioning inputs to AND gate 162. Thus, the switching of this flip-flop to its ONE state deconditions AND gate 162, and thus gate 108, blocking characters outputted from shift register 106 from being applied and stored in delay line 100. These characters are thus effectively erased.

At the first bit time of the next line, a start-of-line clock on line 180 and a bit one (B1) clock on line 175, in conjunction with a signal on ONE-side output line 200 from LINE ERASE flip-flop 196, fully condition AND gate 202 to generate an output on line 204 which is applied to reset LINE ERASE 196 flip-flop to its ZERO state thus permitting normal circulation of information in the delay line loop to resume. The signal on line 204 is also applied through OR gate 174 to condition gate 176 to pass the B1 clock on line 175 through cursor line 178, thus advancing the cursor to be first character position of the line following the line on which the line erase operation was performed. This completes the line erase operation.

An input character from keyboard 24 appears on line 210 and is connected along with cursor detect line 152 as inputs to input control circuit 212. This circuit functions in a standard manner to generate an output on line 214 to OR gate 110 to store the new character in place of the character previously stored at the cursor position, and to advance the cursor to he next character position. Input control circuit 212 generates an output on line 216 when an input character is being loaded which signal is applied through inverter 218 to AND gate 162 to block the application of the old character to OR gate 110 while the new character is being written.

As will be seen in the discussion to follow, an entry mask is provided which contains variable-field-identifying information on its lines 4, 6 and 7 which information is to be erased in total when the first character of variable field information is written on the line. For this purpose, the input-character-present line 216 is also connected as one input to AND gate 220, the other inputs to which are output line 222 from OR gate 224 and character 1 (C1) clock line 223. The inputs to OR gate 224 are the line 4, line 6 and line 7 clocks from clock 114. AND gate 220 is thus fully conditioned to generate an output on line 226 when the first character is written on one of the three indicated lines. The signal on line 226 is applied to set VARIABLE FIELD INPUT (VF) flip-flop 228 to its ONE state. Since ZERO side output line 230 from his flip-flop is one of the inputs to AND gate 162, the setting of this flip-flop to its ONE state deconditions gate 108 blocking, and thus effectively erasing, characters outputted from shift register 106.

When a tab point is detected in the last character position of shift register 106, indicating that the end of the variable field has been reached, detector 150 generates an output on tab detect line 232 which signal is applied as one input to AND gate 234. The other input to this AND gate is ONE-side output line 236 from flip-flop 228. AND gate 234 is thus fully conditioned to generate an output on line 238 which is applied to reset the VF flip-flop to its ZERO state. The desired erasure of the variable-field-identifying information is thus effected and the circuit restored to its initial condition in preparation for the next input.

Circuitry for performing the insert and the tab functions have not been shown in FIG. 4 since these operations are identical to operations presently performed in the before mentioned Bunker-Ramo Series 2200 system. For an insert, a one character shift-right operation is performed for all characters following a detected cursor bit but the position of the cursor bit is left unchanged. This may, for example, be performed by providing an additional one character shift register after gate 108 which is switched into the delay line loop when the characters which it is desired to shift right are outputted from shift register 106. The tab operation is described in detail in the above mentioned Jen, et al application.

OPERATION

Figure 5:
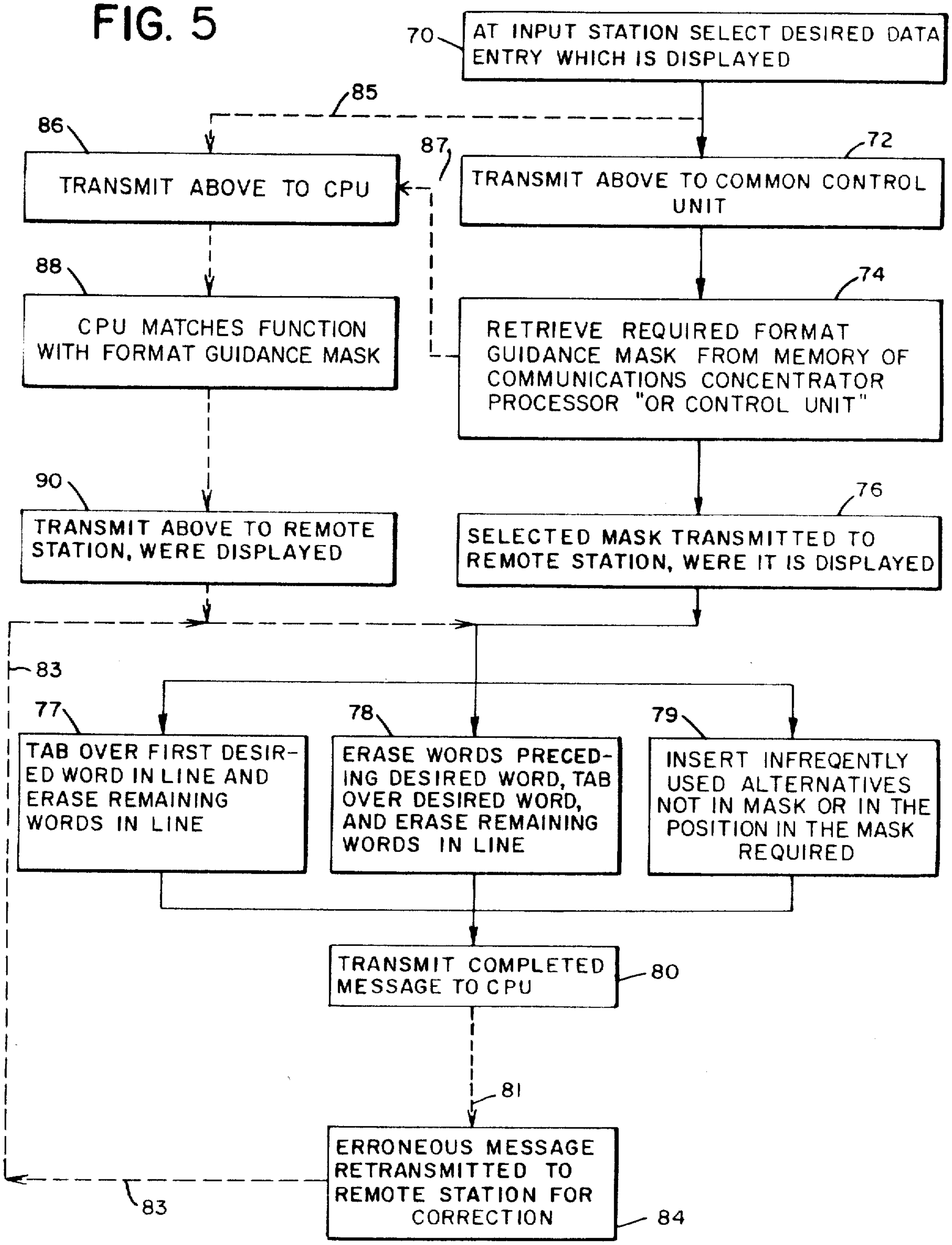
FIG. 5 is a schematic diagram of the method of data entry according to the invention.

The over-all operation of the system to perform data entry may best be understood by referring to FIG. 5. The first operator step is to initiate a format guidance mask request for the particular kind of data entry desired by depressing one of the DATA TYPE REQUEST keys 46 (FIG. 3). The data type entry request is displayed on the first line of the cathode ray tube 22 of remote station 26, as indicated at box 70 of FIG. 5. After the operator has visually verified that he has pressed the right DATA TYPE REQUEST key 46, the request is transmitted to a common control unit 28 (FIG. 2) by depressing a TRANSMIT key 48 (FIG. 3). This is indicated in box 72 (FIG. 5).

Common control unit 28 receives the data type request from a remote station connected to it and transmits the request to its associated communications concentrator processor 30. Assuming that the desired format guidance mask is stored in a memory portion 31 of the concentrator, the mask is retrieved (box 74 of FIG. 5) and transmitted to the requesting input station where it is displayed on the stations' cathode ray tube (as indicated in box 76).

The format guidance mask incorporates alternative words or fields which represent much of the information normally required for the particular data entry. Each group of alternative words is normally arranged on a single line of the display in descending order of use. The data entry message is composed by tabbing over the desired words and erasing the undesired alternatives. Since the alternative words in each group are arranged in order of frequency of use and positioned on a single line, most lines are edited by using a TAB key for tabbing over the desired word and a LINE ERASE key for erasing the remaining undesired alternatives in that particular line, as shown in box 77. If a less frequently used word is desired, the WORD ERASE key is used to individually erase the alternative words that precede the desired work on the particular line. The operator then tabs over the desired word and line erases the remaining undesired words on the line, as represented by box 78.

If an infrequently used word that does not appear on the format guidance mask is desired, an INSERT key is used to enable the operator to key in any character he wishes at a particular position. This desired position can be reached by using the WORD ERASE key or TAB key, as stated in box 79. A word may be entered by multiple operation of th insert key.

In the alternative, the end of a line may be reached by multiple operation of the word erase and/or the tab key and a new word then entered without the use of the INSERT key. The composition of the desired data entry is thus easily achieved with speed and accuracy by an operator having little experience in the field and no typing skill. This system substantially reduces operator error since a minimum of keying operations need be performed and the operator is carefully led through the necessary operations by the format guidance mask displayed before him.

After the completed message is visually verified by the operator, it is transmitted to central data processing station 30, as shown in box 80 of FIG. 5. In some data entry systems it may be recorded for later batch processing. Several common control units 28 may be connected to one central data processing station 30, as shown in FIG. 2. Since there are many input stations 26 connected to each common control unit 28, it becomes readily apparent that one central data processing station can serve a multitude of remote stations.

As represented by line 81 and box 84 of FIG. 5, in the on-line system disclosed, the central data processing station determines if the message is complete and accurate. If there is any error, the central data processing station retransmits this erroneous message to the input station, as shown by line 83. This message is corrected by the operator using the ERASE and INSERT keys and then transmitted to the central data processing station, as represented by boxes 78, 79 and 80.

As shown in boxes 86, 88 and 90 of FIG. 5. various alternative steps are available. Instead of using memory 31 at the communications processor 30 (FIG. 3) for mask storage, the central processing station can be programmed with the format guidance masks. This would allow the operator to transmit the DATA TYPE REQUEST directly to the central data processing station, as shown by line 85 and box 86. The central processing station would match the request with the corresponding format guidance mask, as shown in box 88, and would transmit this back to the requesting remote station, as indicated by box 90.

Another possibility is to enlarge the system memory capacity by using both the memory at the communications processor 30 and that at the central processing unit 33. With this arrangement, the data type request would be operated on at the communications processor, as shown in box 74, where the corresponding mask would be matched if available. If not, the processor 30 would transmit the information request to the central processing unit, as represented by line 87 and box 86, from which the mask is transmitted to the requesting input station, as indicated in boxes 88 and 90.

Another alternative arrangement, as indicated in parenthesis in box 74, is to store and retrieve the mask directly from common control units 28. With such an arrangement, for a preferred embodiment of the invention the name would be retrieved from the CPU, the mask from the common control unit, and the two displayed simultaneously at the remote station. A system is thus provided which allows the rapid, efficient and accurate formation of the desired data entry without normally involving the central processing unit 33 until the message has been completed and is readied for processing.

The detailed operations at a remote station 26 for the composition of a completed data entry message is best understood in detail by referring to FIGS. 3 and 6 through 13. For exemplary purposes, a data entry relating to a stock market transaction will be described.

Figure 6:
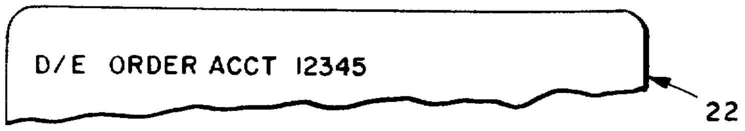
FIG. 6 is a diagram of one example of a format guidance mask request according to the invention as displayed on the cathode ray tube of FIG. 1.

To obtain the format guidance mask for a stock sale transaction, the operator at remote station 26 must first press the mode select key (DATA ENTRY key 44) and a data type request key (e.g. ORDER key 46). As is the case with the Bunker-Ramo Series 2200 equipment and other of the references cited above, all operations performed on keyboard 24 are displayed on cathode ray tube 22. The display for the first operation is shown in FIG. 6. Thus, when the DATA ENTRY key 44 is pressed, "D/E" is displayed; and when the ORDER key 46 is pressed, "ORDER" is displayed.

Figure 7:
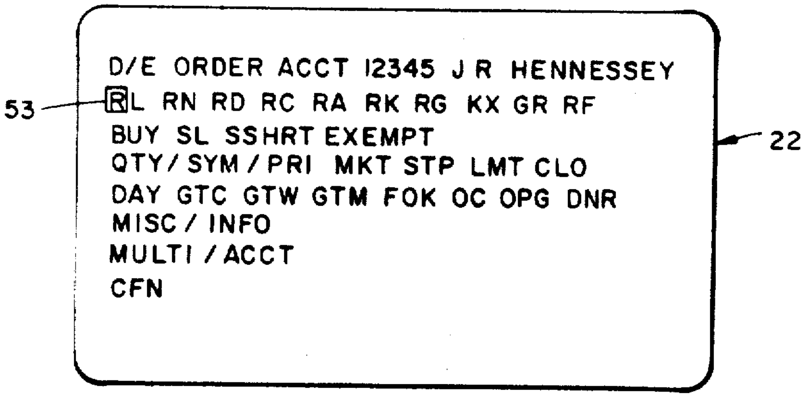
FIG. 7 is a diagram of one example of a format guidance mask according to the invention as displayed on the cathode ray tube of FIG. 1 along with the request line of FIG. 6.

Before transmitting the mask request, the operator presses the alpha keys to display "ACCT" and then presses the numeric keys representing the customer's account number, for example "12345". This is displayed on cathode ray tube 22, as shown in FIG. 6. The operator visually verifies the display on cathode ray tube 22 and then presses TRANSMIT key 48. As will be understood by those skilled in the art, the name corresponding to the entered account number can be retrieved from the system's memory and displayed on cathode ray tube 22 along with the desired mask, as shown in FIG. 7. The alternative ways in which this mask may be retrieved have been previously described.

The following Table is an explanation of the codes employed in the format guidance mask for stock "ORDER" data entry. The parenthetic expression "(constant mnemonics)" in the table identifies those words that appear on the cathode ray tube which require merely a YES or NO decision during the editing of the format. The parenthetic expression "(variable fields)" in the table identifies those words which remind the operator to insert some additional information, if he deems it necessary. In the table, the mnemonics appearing in the display are bracketed — [ ] — and followed by their definition.

TABLE

| Line Number | |
|---|---|
| 1 | [D/E] mode designator, [ORDER] data type, [ACCT 12345] account number, [J R HENNESSEY] account name. |
| 2 | (constant mnemonics–exchange code) [RL] NYSE Round Lot Day, [RN] NYSE Round Lot Open, [RD] NYSE Odd Lot, [RC] ASE Round Lot Day, [RA] ASE Round Lot Open, [RK] ASE Odd Lot, [KG] Marketing, [KX] Toronto, [GR] Chicago Commodity, [RF] NY Commodity. |
| 3 | (constant mnemonics) [BUY] Buy, [SL] Sell, [SSHRT] Sell Short, [EXEMPT] Exempt. |
| 4 | (variable fields) [QTY] quantity, [SYM] symbol, [PRI] price; (constant mnemonics) [MKT] Market, [STP] Stop, [LMT] "price" Limit, [CLO] On Close. |
| 5 | (constant mnemonics) [DAY] Day, [GTC] Good Until Cancelled, [GTW] Good This Week, [GTM] Good This Month, [FOK] Fill or Kill, [OC] Or Cancel, [OPG] At Opening Only, [DNR] Do Not Reduce. |
| 6 | (variable field) [MISC/INFO] miscellaneous information. |
| 7 | (variable field) [MULTI/ACCT] multiple account number. |
| 8 | (constant mnemonics) [CFN] confirm "quantity". |

After confirming that the entered account number corresponds to the retrieved account name, the operator composes the order message. Speed is enhanced in the composition of the order message since only four keys are primarily used, namely INSERT key 34, TAB key 36, WORD ERASE key 38, and LINE ERASE key 40. The order editing begins on the second line of the cathode ray tube display where the cursor 53 is located after the system has entered the account number to aid the operator in editing the mask.

Figure 8:
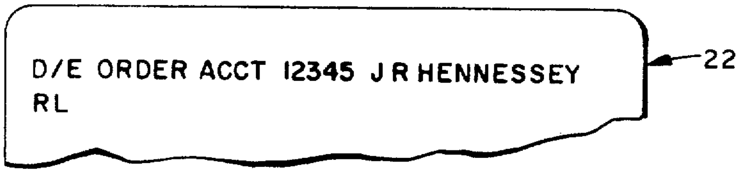
FIGS. 8 through 13 are diagrams, similar to FIG. 6, showing in detail how the mask is edited and data entered according to the invention.

Assuming that a ROUND LOT is the desired symbol for the order message, the operator presses TAB key 36. This causes the cursor to position itself on the first character of code RN. Since the remainder of line 1 is not required, the line is then erased by pressing LINE ERASE key 40. The LINE ERASE key causes a blanking of that information in the display memory, and also causes the cursor to clear and advance one line, positioning itself on the first character of the third line. FIG. 8 shows the resulting display on cathode ray tube 22 for lines 1 and 2.

Figure 9:
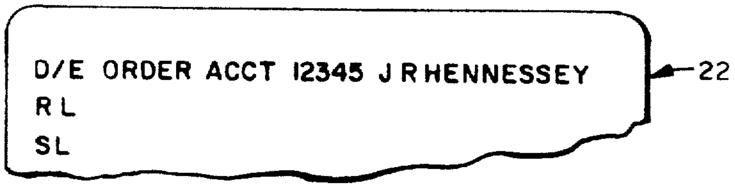

Assuming the desired operation is the sale of stock, the proper editing of line 3 consists of first pressing the WORD ERASE key 38, causing the BUY field to be blanked in the display memory and thus deleted from the display. As was indicated previously, this erase operation also causes the bit signals for the remaining fields on this line to shift one field to the left so that SL is now in the first and second character positions of the line with the cursor over the first character position of the line. The operator then presses TAB key 36, causing the cursor to move one field to the right, passing over SL and positioning itself on the first character of SSHRT. Since the remaining displayed fields on line 3 are not required for this operation, the operator erases the remainder of line 3 by pressing LINE ERASE key 40. The cursor clears and advances one line, positioning itself on the first character of the fourth line. FIG. 9 shows the edited display on cathode ray tube 22 for lines 1 through 3.

Figure 10:
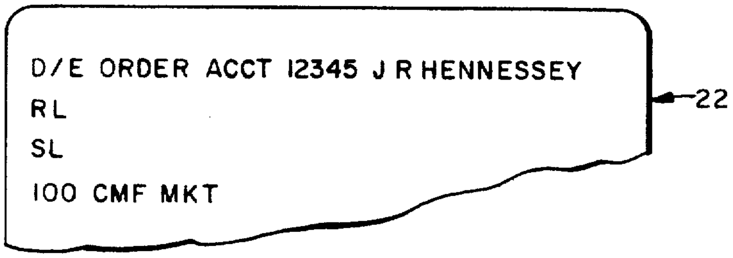

In accordance with the format guidance mask, the operator must now insert the quantity, stock name, and price at which the stock concerned is to be sold. This operation is achieved by first pressing the numeric keys representing the quantity concerned. Assuming 100 shares are to be sold, the operator presses the keys "1"-"0"-"0" on typewriter keyboard 32. Upon pressing the numeric key "1", the field "QTY/SYM/PRI" is automatically cleared from cathode ray tube 22. Circuitry for performing this clear function is shown in FIG. 4 and described above. After entering the quantity, space key 50 is pressed, causing one space to be entered on cathode ray tube 22. The operator now presses the keys on typewriter keyboard 32 which will display the symbol for the corporation's name whose stock is to be sold; for example, alpha keys 33, 35 and 37, displaying the symbol CMF on cathode ray tube 22. Since no specific price is required in this transaction, WORD ERASE key 38 is pressed, causing the blank field following the stock symbol to be erased and resulting in the entire line shifting one field to the left so that MKT immediately follows the entered symbol. The cursor is positioned on the first character of MKT. In this instance the word erase key is being used as a shift key. Since the desired sale price is the market price, the operator presses TAB key 36, causing the cursor to pass over the field MKT and position itself on the first character of STP. The remainder of line 4 is not required for this transaction and the operator presses LINE ERASE key 40, clearing the remainder of line 4 and causing the cursor to clear and advance one line to the first character position of the fifth line. In FIG. 10, edited lines 1 through 4 are shown as they would appear on cathode ray tube 22.

Figure 11:
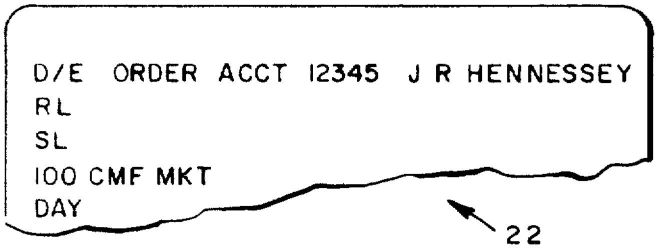

Since this stock sale is to be effective for one day only, the operator presses TAB key 36, causing the cursor to pass over the DAY field and position itself on the first character of the GTC field. The remainder of line 5 is not required for this transaction and is cleared by pressing LINE ERASE key 40. This also causes the cursor to clear and advance one line to the first character position of the sixth line. In FIG. 11, the edited display on cathode ray tube 22 is shown for lines 1 through 5.

Figure 12:
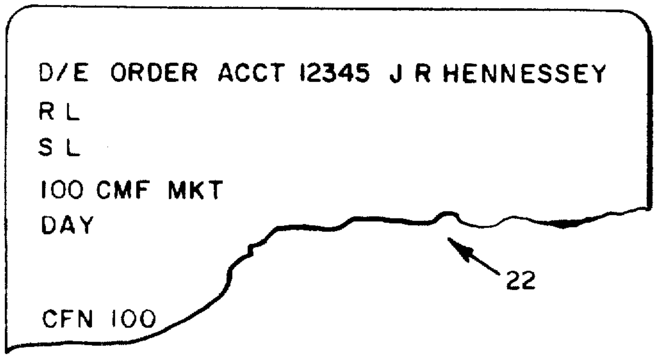

Since there is no miscellaneous information to be entered, line number 6 is cleared by pressing LINE ERASE key 40. This also causes the cursor to clear and advance one line to the first character position of the seventh line. Since this is a single account order, line number 7 is also cleared by pressing LINE ERASE key 40. The line is erased and the cursor positions itself on the first character of the eighth line. Since confirmation of the quantity sold is desired, the operator presses TAB key 36, causing the cursor to pass over CFN field and position itself in the first character position of the blank field which follows. The operator now presses the numeric keys representing the quantity of stock to be confirmed; in this case, the numeric keys "1"-"0"-"0" are pressed. The completed message for this data entry is shown in FIG. 12. The operator now visually verifies the edited display on cathode ray tube 22 to assure that it is complete and accurate. He then presses TRANSMIT key 48 to send the data entry message to central data processing station 30.

If the transmitted message is invalid, the central data processing station 30 automatically sends a short rejection message, indicating the reason for rejection, to the originating remote station 26. The rejection message is written on cathode ray tube 22 following the displayed order. The operator may make the necessary corrections and retransmit this corrected order. This correction is accomplished in parallel and without processing or routing the order to the exchange. The rejection message may consist of displaying the transmitted message on cathode ray tube 22 at the originating input station 26 with the words or fields that are in error blinking, as in the Bunker-Ramo Series 2200 systems.

Figure 13:
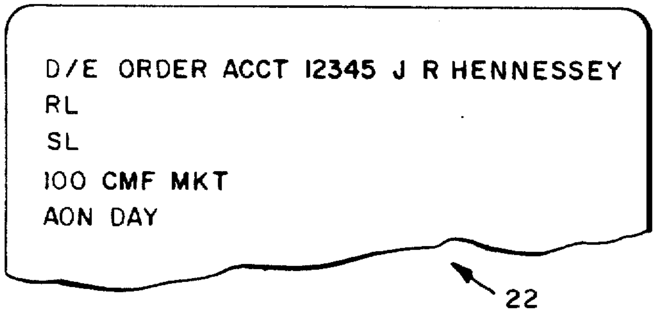

The number of mnemonics included in the format guidance mask may be increased, but it is desirable to limit displayed mnemonics to those most frequently used. As mentioned above, the alternative constant mnemonics are normally grouped into lines, with the most frequently selected alternative mnemonic appearing first in the line, the second most frequently selected constant mnemonic appearing second, etc. This arrangement substantially reduces the key strokes required to complete a data entry. If mnemonics not appearing on the screen are required in the order, they may be entered from keyboard 24. Using the stock order described above as an example, if AON "all or none" was required preceding the notation DAY on line 5, the operator can easily accomplish this by first pressing INSERT key 34. This causes all fields to the right of DAY field "including DAY" to shift one character to the right. As indicated previously, a word having a desired number of characters may be entered by multiple depression of the INSERT key. The cursor is located in the first character position of the line. The operator then presses the necessary alpha keys on typewriter keyboard 32, causing the mnemonic AON to be displayed on cathode ray tube 22. Then TAB key 36 is pressed, causing the cursor to pass over the DAY field and position itself on the first character of GTC. Since the remainder of this line is not required, it can be cleared by pressing LINE ERASE key 40. This also causes the cursor to clear and advance one line to the first character position of the sixth line. FIG. 13 shows cathode ray tube 22 for the first five lines of this alternate edited message.

This invention provides a data entry system that is fast and accurate even when operated by unskilled and untrained personnel. Since the system provides a format guidance mask which displays the most frequently used alternate words on each line in descending frequency of use, the operator can compose the data entry by watching the cathode ray tube and keeping his hand on the conveniently grouped editing keys. The operator in many situations will never have to take his eyes off the cathode ray tube display. It should be noted that, should changes in ordering pattern indicate the desirability of adding or deleting a constant mnemonic, or of changing the order of the mnemonics on a line, this may easily be accomplished by a change in the stored information at the CPU or changes generally under CPU control in the stored information at the concentrator processor or the common control unit without requiring any change at the remote stations or any hardware changes in the system. Complete flexibility is thus provided. It should also be noted that, while in the discussion above, the mask is displayed at a location remote from the CPU with various control units in between, the display could be fed directly from the CPU and used for example by a computer console operator.

Further, while in the preferred embodiment of the invention described above, the alternative constant mnemonics are limited to a single line and are mutually exclusive, neither of these features is a limitation on the invention. Thus, in other applications, it is possible that more than one of the constant mnemonics appearing on a single line might be selected for transmission. This would be accomplished by word erasing until a desired word was reached, tabbing over this word, word erasing until a second desired word is reached, tabbing over this word, and repeating this sequence of operations for subsequent words on the line, with the line erase key being operated after the tabbing over of the last desired word on the line. Since, with this arrangement, some words would normally precede others in the final text, the ordering of words on a line would not necessarily depend on the frequency-of-use criteria previously indicated. If an alternative group of constant mnemonics extended over more than one line of the display, the line erase key would be initially operated if the desired word did not appear in the first line. The line erase key would be operated twice in succession after the desired word was tabbed over if the desired word appeared in the first line.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

What is claimed is:

1. A method of entering data into a data processing system having at least one input station, said data being entered by filling in the information required in one or more fields of a form, there being alternative words which may be entered in at least one of said fields, comprising the steps of:

indicating that data is to be entered into the system, and, where necessary, the form in which it is to be entered;

displaying a guidance mask at said input station which mask contains format information for said form and also includes for said at least one field of the form a group of alternative words to be entered into the system;

editing said mask by selectively identifying desired ones of said alternative words;

displaying the results of said editing step;

indicating, when the data for all required fields of the form has been entered, the editing of fields containing alternative words having been completed, that said edited mask is ready for processing by said system; and transmitting the edited mask to the system.

2. A method of the type described in claim 1 wherein said editing step of identifying desired ones of said alternative words includes the step of erasing undesired ones of said alternative words.

3. A method of the type described in claim 2 wherein said system includes a central processing unit (CPU);

wherein said input station is remote from said CPU; and wherein said transmitting step includes the step of transmitting said edited mask to said CPU.

4. A method of the type described in claim 1 including the step of indicating the format in which data is to be entered into the system, and thus the required mask.

5. A method of the type described in claim 2 wherein said editing step includes the step of tabbing over desired ones of said alternative words.

6. A method of the type described in claim 5 wherein said editing step includes the steps of erasing alternative words until a desired word is reached, tabbing over a desired word, and group erasing the remaining words of the group after the last desired word of the group has been tabbed over.

7. A method of the type described in claim 6 wherein there are a plurality of said groups of alternate words, each of said groups appearing for a different field of said guidance mask; and wherein said editing steps are repeated for each of said groups.

8. A method of the type described in claim 5 wherein each of said groups are confined to a single line of the display mask.

9. A method of the type described in claim 6 wherein there is only a single desired word in each of said groups.

10. A method of the type escribed in claim 6 wherein there is at said remote station a keyboard having a tab, a word erase, and a group erase key; and wherein
said editing steps may be performed solely by the operation of said three keys.

11. A method of the type described in claim 10 wherein each of said groups are confined to a single line of the display mask; and wherein
said group erase key is a line erase key.

12. A method of the type described in claim 6 wherein the words in each alternative group of words are arranged in sequence according to their descending frequency of use in completed data entries.

13. A method of the type described in claim 1 wherein said editing step includes the step of inserting into said mask for a given field a desired alternative word which does not appear in said group of alternative words.

14. A method of the type described in claim 13 wherein said desired word may be inserted at any selected point in said group.

15. A method of the type described in claim 1 wherein said mask also includes variable field identifying information; and
including the step of erasing the variable field identifying information when the first data for the variable field is entered into the system.

16. A method of the type described in claim 3 wherein said system includes a remote processor; and
including the step of retrieving the mask from said remote processor.

17. A method of the type described in claim 3 including the step of retrieving said mask from the CPU.

18. A method of the type described in claim 6 including the step of displaying a cursor with said mask, the cursor indicating the word on the display on which the next editing operation is to be performed.

19. A method of the type described in claim 18 wherein there is a tab point at the beginning of each alternative word of said group; and
wherein said tabbing step includes the step of advancing the cursor to the beginning of the next word.

20. A method of the type described in claim 18 wherein said alternative word erasing step includes the steps of erasing the word containing the cursor and shifting all words of the group following the erased word one word position to the left, the position of the cursor remaining unchanged.

21. A method of the type described in claim 18 wherein said group erasing step includes the steps of erasing the word containing the cursor and all succeeding words of the group, and advancing the cursor to the beginning of the first word of the mask following the end of the erased group.

22. A method of the type described in claim 21 wherein said group is confined to a single line of the display mask; and
wherein said cursor is advanced to the beginning of the next line during said group erase step.

23. A method of the type described in claim 1 including the steps of error checking said edited mask at said CPU; and
retransmitting the erroneously edited mask to the input station from which it was transmitted.

24. A method of the type described in claim 23 wherein said mask comprises fields of data; and
including the step of displaying said erroneously edited mask at the input station to which it is transmitted together with an indication of the one or more erroneous fields therein.

25. A method of the type described in claim 1 wherein the data entered into said data processing system relates to a stock market transaction.

26. A system for entering data which is to be presented in at least one predetermined multifield format into a data processing system comprising:
an input station having a display device and a keyboard, said keyboard including a tab key and a word erase key;
storage means;
one or more format guidance masks stored in said storage means, each of said masks containing information in one of said predetermined formats to be entered into said data processing system, there being a group of alternative words for at least one field of each mask;
means responsive to a first input from said keyboard indicating a format for retrieving a selected mask corresponding to the indicated format from said storage means and for displaying said mask on said display device;
means responsive to second inputs from said keyboard for editing said mask by selectively identifying desired ones of said alternative words, said editing means including means for displaying a cursor with said mask, the cursor indicating the word at which the next editing operation is to begin, means responsive to the operation of the tab key for advancing the cursor to the next succeeding word on the display, and means responsive to the operation of the word erase key for erasing the word marked by the cursor and for shifting the cursor to the succeeding word of the group; and
means for entering said edited mask into said data processing system.

27. A system of the type described in claim 26 wherein said means for editing the mask by selectively identifying desired ones of said alternative words includes means for selectively erasing undesired ones of said alternative words.

28. A system of the type described in claim 26 wherein said cursor shifting means includes means for shifting all words of the group following the erased word to the left by one word position.

29. A system of the type described in claim 26 wherein said keyboard includes a group erase key; and wherein
said editing means includes means responsive to the operation of said group erase key for erasing the word containing the cursor and all words of the group following it and for advancing the cursor to the beginning of the first word following the group.

30. A system of the type described in claim 29 wherein said group is confined to a single line of the display mask; and
wherein said group erase key is a line erase key, the cursor being advanced to the beginning of the next line in response to the operation of the key.

31. A system of the type described in claim 29 wherein said tab, word erase and group erase keys are located together on said keyboard for multifinger one-hand operation.

32. A system of the type described in claim 29 wherein said keyboard includes an insert key and data entry keys; and wherein said editing means includes means responsive to the operation of said insert key for shifting the word containing the cursor, and all words of the group succeeding it, one or more character positions to the right, the position of the cursor remaining unchanged, and means responsive to subsequent operation of the data entry keys for displaying the entered data in the vacated spaces.

33. A system of the type described in claim 32 wherein said tab, word erase, group erase and insert keys are located together on said keyboard for multifinger one-hand operation.

34. A system of the type described in claim 26 wherein said editing means includes means for storing the mask while it is being displayed and edited.

35. A system of the type described in claim 26 wherein said mask also includes variable field identifying information;

wherein said keyboard includes data entry keys; and including means responsive to the operation of the first data entry key to enter data into a variable field for erasing the variable field identifying information.

36. A system of the type described in claim 26 wherein said data processing system includes a CPU, a remote communications processor, and a plurality of said input stations communicating with said CPU through said communications processor; and wherein said mask storage means is located at said communica-tions processor.

* * * * *